United States Patent
Kim et al.

(10) Patent No.: US 10,388,439 B2
(45) Date of Patent: Aug. 20, 2019

(54) FERRITE MAGNETIC SUBSTANCE AND METHOD OF MANUFACTURING THE SAME

(71) Applicants: HYUNDAI MOTOR COMPANY, Seoul (KR); HYUNDAI MOBIS CO., LTD., Seoul (KR)

(72) Inventors: Young Min Kim, Icheon (KR); Choul Hwan Ham, Seoul (KR); Kee Yang Lee, Hwaseong-si (KR); Hee Bok Kang, Yongin-si (KR)

(73) Assignees: Hyundai Motor Company, Seoul (KR); Hyundai Mobis Co., Ltd., Seoul (KR)

( * ) Notice: Subject to any disclaimer, the term of this patent is extended or adjusted under 35 U.S.C. 154(b) by 217 days.

(21) Appl. No.: 15/377,357

(22) Filed: Dec. 13, 2016

(65) Prior Publication Data

US 2018/0096761 A1 Apr. 5, 2018

(30) Foreign Application Priority Data

Oct. 5, 2016 (KR) .......................... 10-2016-0128346

(51) Int. Cl.
*C04B 35/26* (2006.01)
*C01G 49/00* (2006.01)
(Continued)

(52) U.S. Cl.
CPC .......... *H01F 1/0315* (2013.01); *B22F 3/1017* (2013.01); *B22F 9/04* (2013.01);
(Continued)

(58) Field of Classification Search
CPC .................. C04B 35/2658; C01G 49/0072
See application file for complete search history.

(56) References Cited

U.S. PATENT DOCUMENTS 5,846,448 A * 12/1998 Yasuhara ............. C01G 49/009
  252/62.56
6,077,453 A * 6/2000 Saita ................... C04B 35/2658
  252/62.59

(Continued)

FOREIGN PATENT DOCUMENTS

JP       4936110 B2     5/2012
JP     2016113330   *   6/2016

(Continued)

OTHER PUBLICATIONS

Office Action dated Aug. 14, 2017 of corresponding Korean Patent Application No. 10-2016-0128346—5 pages.

*Primary Examiner* — Matthew E. Hoban

(74) *Attorney, Agent, or Firm* — Knobbe Martens Olson & Bear LLP

(57) ABSTRACT

Disclosed is a method of manufacturing a ferrite magnetic substance, including: a first mixing operation of providing a first mixture composed of 47 to 49 wt % of Fe, 16 to 18 wt % of Mn, 5.2 to 7.2 wt % of Zn, and a remainder of oxygen and other inevitable impurities, a second mixing operation of providing a second mixture composed of the first mixture and an additive including, based on 100 parts by weight of the first mixture, 28 to 51 ppm of Si, 140 to 210 ppm of Nb and 155 to 185 ppm of Zr, and a finish operation of producing a ferrite magnetic substance by sintering the second mixture.

9 Claims, 8 Drawing Sheets

(51) Int. Cl.
  *H01F 1/03*     (2006.01)
  *B22F 3/10*     (2006.01)
  *B22F 9/04*     (2006.01)
  *C04B 35/626*   (2006.01)
  *C04B 35/64*    (2006.01)
  *C22C 30/06*    (2006.01)
  *H01F 41/02*    (2006.01)
  *H01F 1/34*     (2006.01)

(52) U.S. Cl.
  CPC ...... *C01G 49/0072* (2013.01); *C04B 35/2658* (2013.01); *C04B 35/6261* (2013.01); *C04B 35/62685* (2013.01); *C04B 35/64* (2013.01); *C22C 30/06* (2013.01); *H01F 1/0317* (2013.01); *H01F 1/344* (2013.01); *H01F 41/0246* (2013.01); *H01F 41/0253* (2013.01); *B22F 2301/35* (2013.01); *B22F 2302/25* (2013.01); *B22F 2303/01* (2013.01); *B22F 2998/10* (2013.01); *C01P 2002/50* (2013.01); *C01P 2002/52* (2013.01); *C01P 2004/62* (2013.01); *C01P 2006/12* (2013.01); *C01P 2006/80* (2013.01); *C04B 2235/3208* (2013.01); *C04B 2235/3244* (2013.01); *C04B 2235/3251* (2013.01); *C04B 2235/3263* (2013.01); *C04B 2235/3268* (2013.01); *C04B 2235/3274* (2013.01); *C04B 2235/3284* (2013.01); *C04B 2235/3418* (2013.01); *C04B 2235/5409* (2013.01); *C04B 2235/5436* (2013.01); *C04B 2235/5445* (2013.01); *C04B 2235/77* (2013.01); *C04B 2235/85* (2013.01)

(56) References Cited

U.S. PATENT DOCUMENTS

2008/0007377 A1\* 1/2008 Ishiwaki ............. C04B 35/2658
                                                              335/297
2019/0062217 A1\* 2/2019 Miyoshi ................ C01G 49/00

FOREIGN PATENT DOCUMENTS

| KR | 10-2006-0057651 A | 5/2006 |
| KR | 10-1141278 B1 | 5/2012 |
| KR | 10-2016-0022409 A | 3/2016 |
| WO | 2013/174100 A1 | 11/2013 |

\* cited by examiner

[FIG. 1]
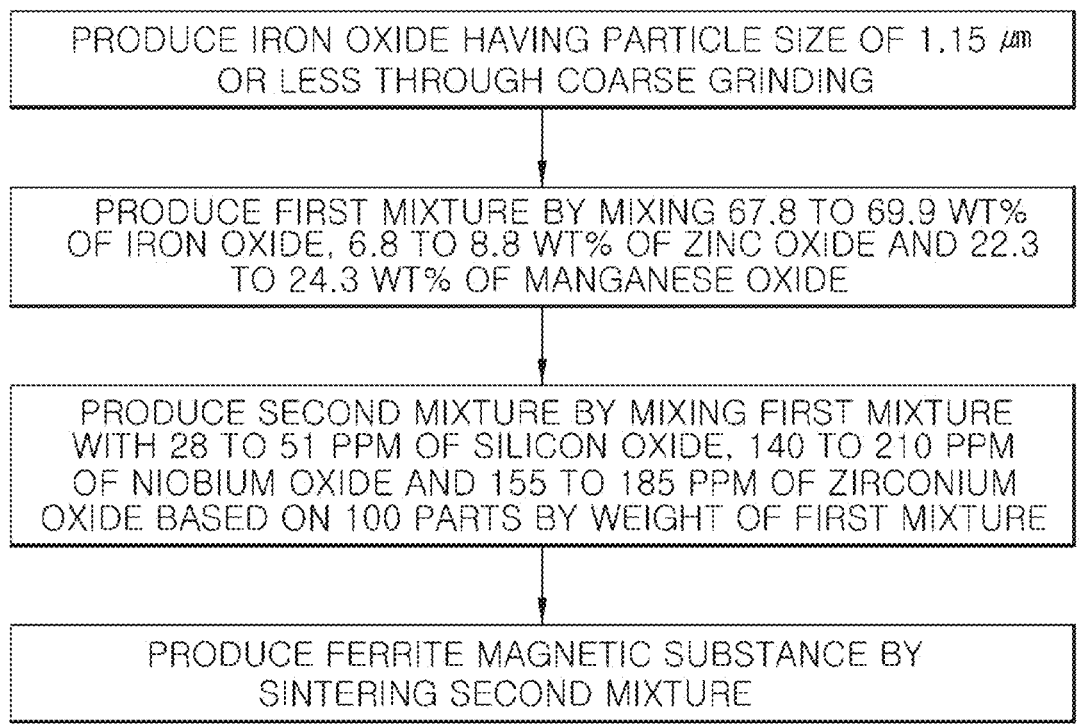

[FIG. 2]
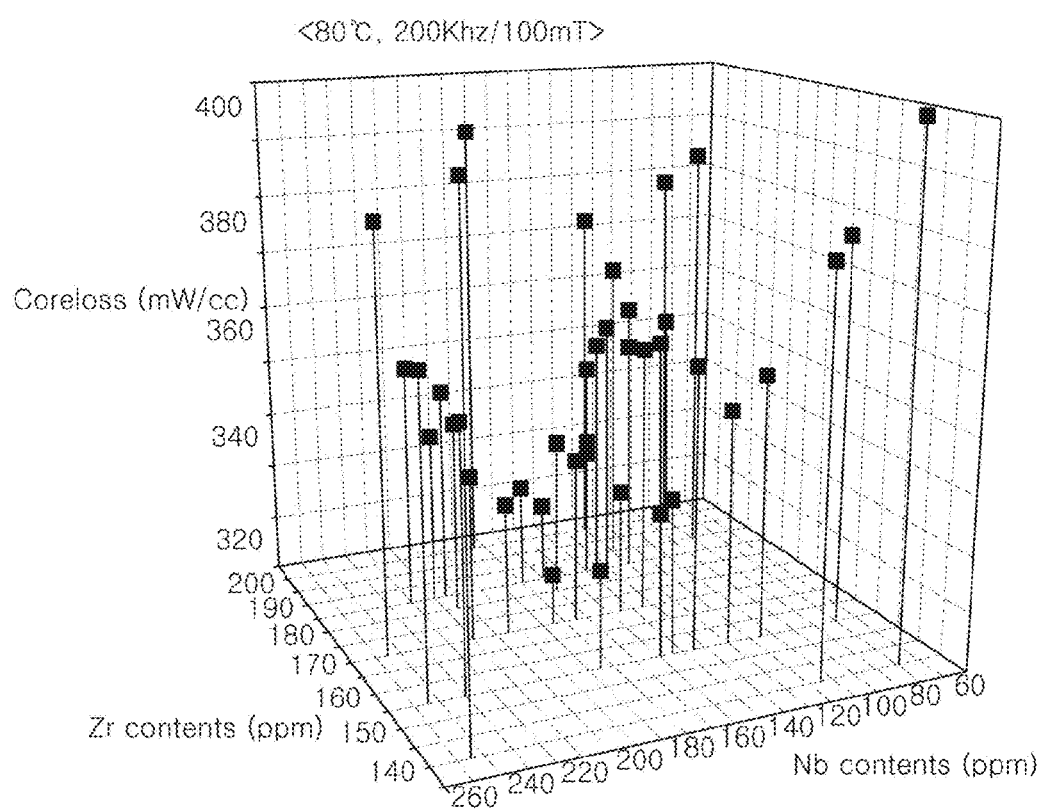

[FIG. 3]
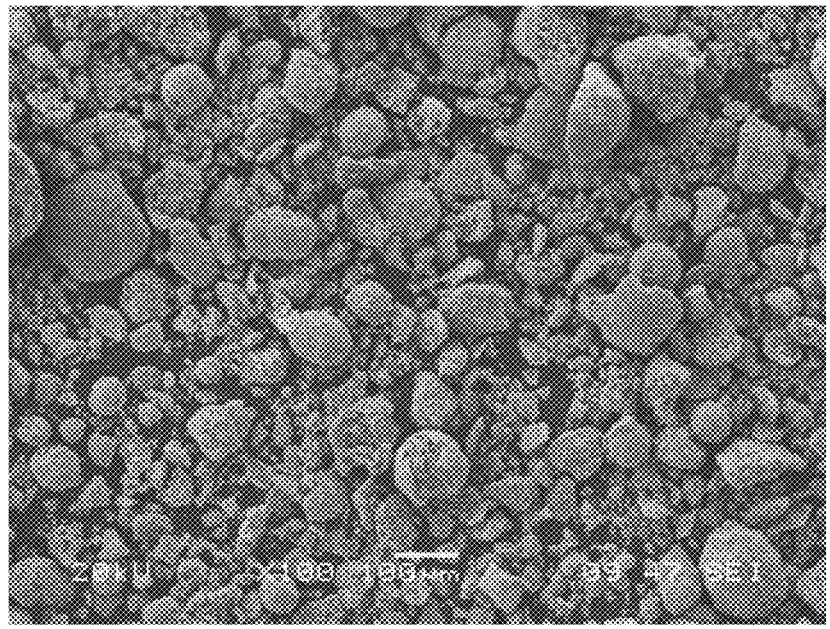
[FIG. 4]
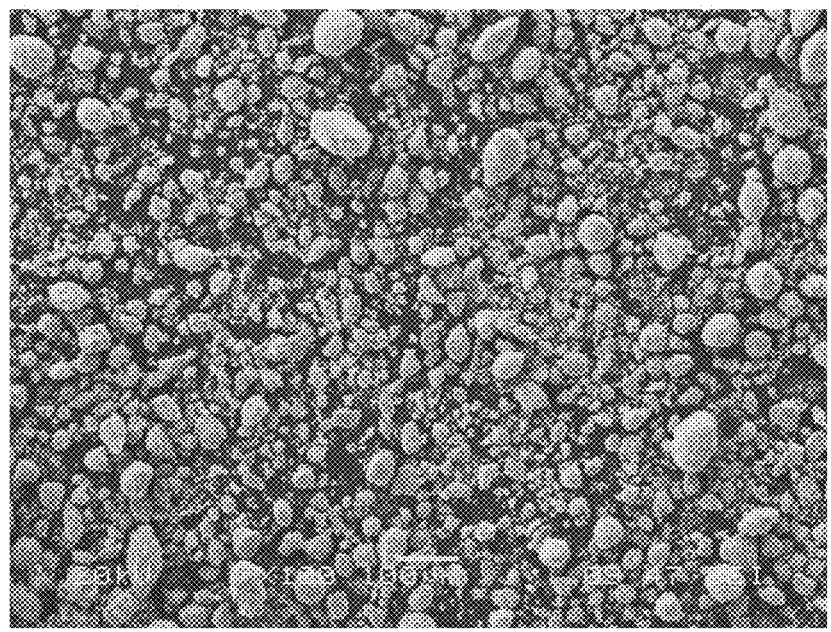

[FIG. 5]
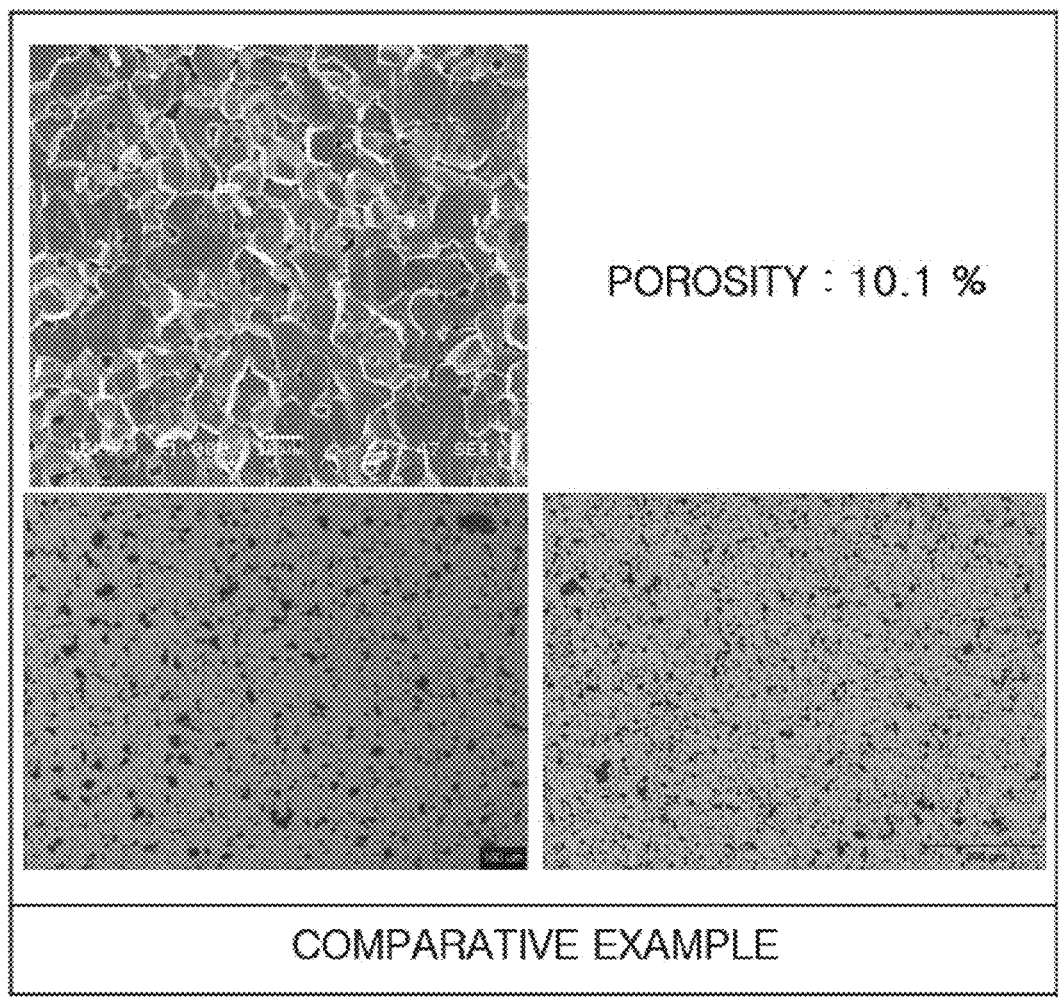

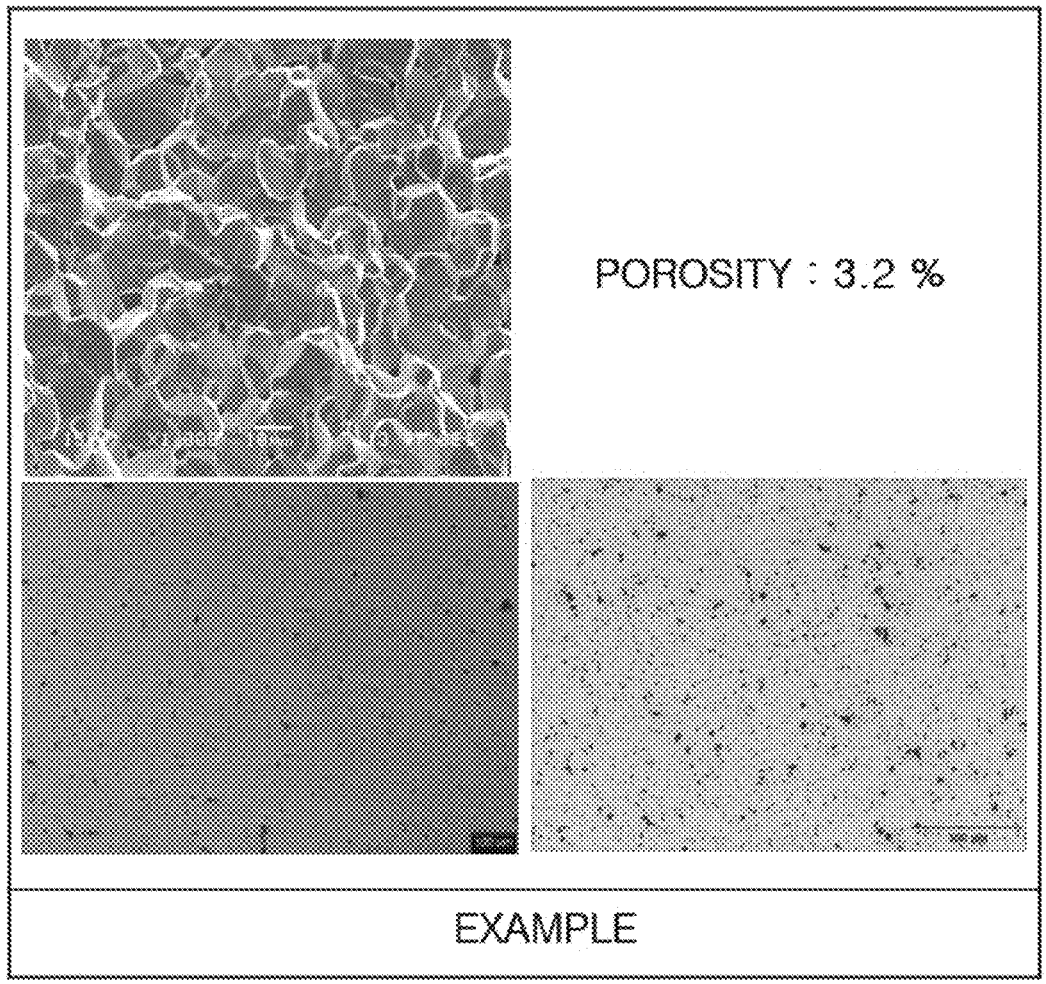

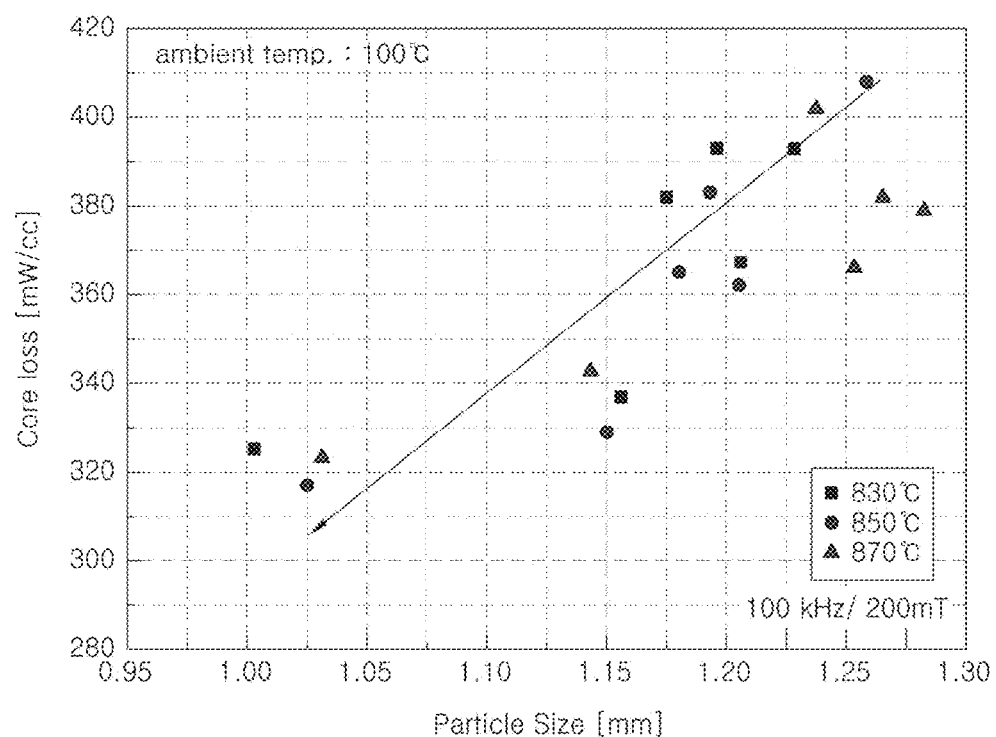
[FIG. 7]

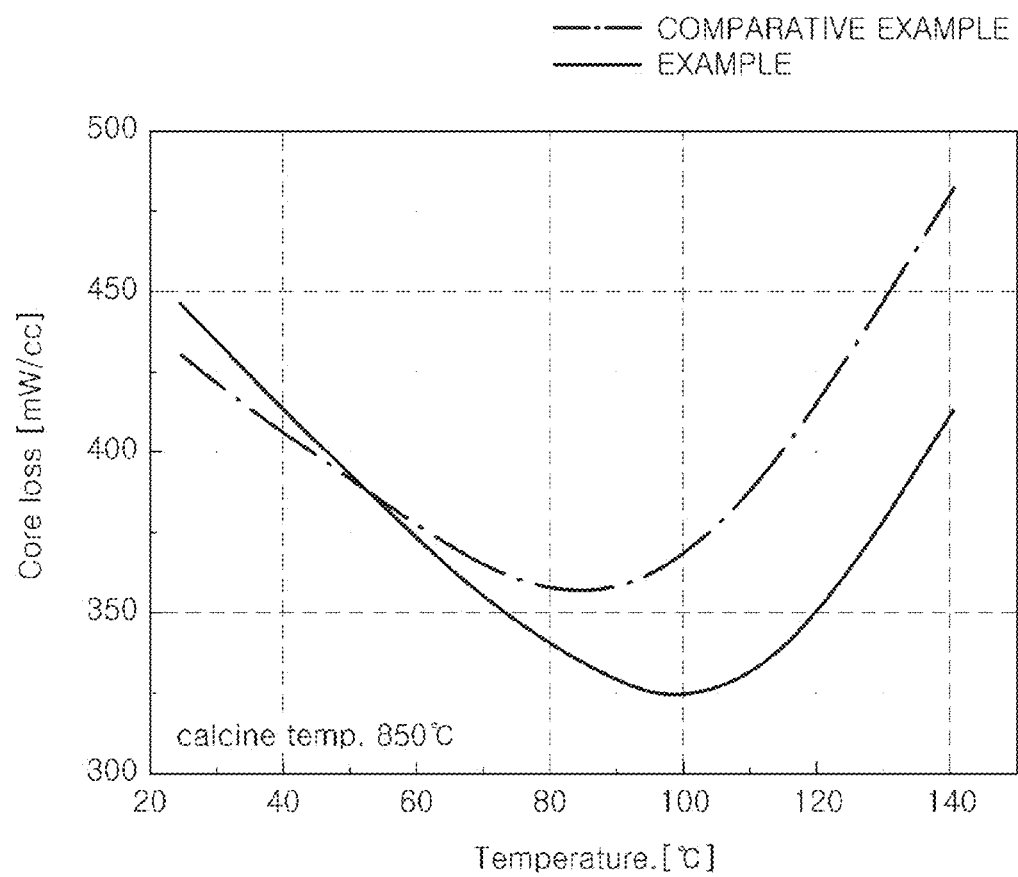
[FIG. 8]

[FIG. 9]

| No. | COMPOSITION (wt%) | | | CORE LOSS (100kHz/20mT) | | | | | | DENSITY (g/cc) | PERMEABILITY | MAGNETIC FLUX DENSITY (mT) |
|---|---|---|---|---|---|---|---|---|---|---|---|---|
| | Fe₂O₃ | ZnO | Mn₃O₄ | 25°C | 60°C | 80°C | 100°C | 120°C | 140°C | | | |
| CEX 1 | 70.35 | 5.8 | 23.85 | 430 | 376 | 353 | 362 | 413 | 482 | 4.8 | 3189 | 522 |
| CEX 2 | 70.83 | 6.84 | 22.33 | 406 | 438 | 428 | 429 | 476 | 561 | 4.846 | 3365 | 522 |
| CEX 3 | 70.77 | 7.3 | 21.93 | 462 | 402 | 388 | 398 | 450 | 528 | 4.857 | 3146 | 521 |
| CEX 4 | 69.86 | 8.24 | 21.9 | 406 | 331 | 353 | 408 | 486 | 572 | 4.797 | 3301 | 525 |
| CEX 5 | 69.62 | 6.1 | 24.28 | 381 | 327 | 355 | 402 | 451 | 525 | 4.803 | 3264 | 527 |
| EX 1 | 69.31 | 5.79 | 24.9 | 408 | 356 | 330 | 362 | 437 | 503 | 4.781 | 3092 | 527 |
| EX 2 | 69.29 | 6.81 | 23.9 | 359 | 313 | 330 | 342 | 449 | 524 | 4.805 | 3446 | 526 |
| EX 3 | 69.23 | 6.8 | 23.97 | 434 | 352 | 323 | 325 | 359 | 434 | 4.808 | 3387 | 526 |
| EX 4 | 69.08 | 7.82 | 23.1 | 408 | 333 | 324 | 337 | 404 | 472 | 4.767 | 3361 | 522 |
| EX 5 | 68.99 | 6.71 | 24.3 | 427 | 351 | 333 | 379 | 422 | 498 | 4.785 | 3250 | 522 |
| EX 6 | 68.85 | 7.85 | 23.3 | 352 | 305 | 295 | 335 | 393 | 452 | 4.931 | 3350 | |
| EX 7 | 68.81 | 6.79 | 24.4 | 433 | 317 | 324 | 410 | 527 | 596 | 4.781 | 3578 | 525 |
| EX 8 | 68.67 | 7.32 | 24.01 | 407 | 324 | 325 | 346 | 430 | 515 | 4.786 | 3393 | 523 |
| EX 9 | 68.66 | 7.38 | 23.96 | 389 | 332 | 327 | 341 | 417 | 472 | 4.818 | 3410 | 526 |
| CEX 6 | 68.59 | 6.75 | 24.66 | 356 | 360 | 353 | 395 | 466 | 552 | 4.797 | 3329 | 525 |
| CEX 7 | 68.48 | 7.49 | 24.03 | 430 | 358 | 324 | 329 | 392 | 460 | 4.81 | 3382 | 527 |
| CEX 8 | 68.4 | 8.86 | 22.74 | 443 | 364 | 353 | 361 | 442 | 524 | 4.82 | 3153 | 526 |
| CEX 9 | 68.34 | 5.78 | 25.88 | 396 | 323 | 338 | 383 | 449 | 537 | 4.806 | 3361 | 522 |
| CEX 10 | 68.11 | 9.02 | 22.87 | 446 | 371 | 340 | 317 | 344 | 413 | 4.823 | 3374 | 528 |
| CEX 11 | 67.99 | 7.12 | 24.89 | 430 | 376 | 353 | 362 | 413 | 482 | 4.804 | 3189 | 522 |
| CEX 12 | 67.81 | 8.84 | 23.35 | 437 | 379 | 349 | 367 | 421 | 521 | 4.808 | 3157 | 522 |
| CEX 13 | 67.26 | 8.78 | 23.96 | 440 | 369 | 348 | 365 | 398 | 471 | 4.779 | 3293 | 521 |
| CEX 14 | 68.2 | 8.72 | 24.08 | 412 | 346 | 353 | 395 | 464 | 542 | 4.783 | 3361 | 520 |
| CEX 15 | 67.12 | 8.76 | 24.12 | 429 | 362 | 350 | 343 | 370 | 438 | 4.837 | 3287 | 521 |
| CEX 16 | 67 | 8.2 | 24.8 | 478 | 432 | 420 | 446 | 500 | 588 | 4.831 | 3187 | 524 |
| CEX 17 | 66.77 | 6.8 | 26.43 | 500 | 466 | 477 | 526 | 607 | 724 | 4.822 | 3629 | 523 |

FERRITE MAGNETIC SUBSTANCE AND METHOD OF MANUFACTURING THE SAME

CROSS REFERENCE TO RELATED APPLICATION

The present application claims priority of Korean Patent Application No. 10-2016-0128346 filed on Oct. 5, 2016, the entire contents of which is incorporated herein for all purposes by this reference.

BACKGROUND

Field

The present disclosure relates to a ferrite magnetic substance and a method of manufacturing the same.

Description of the Related Art

Due to the depletion of fossil energy and environmental pollution these days, the need to develop techniques for minimizing the use of fossil energy is increasing. Accordingly, environmentally friendly vehicles, such as hybrid vehicles, which are driven by the combination of power of an internal combustion engine and electrical power, and electrical vehicles, which use electrical power, are receiving attention.

Typically, environmentally friendly vehicles are driven by electricity, unlike conventional systems using hydraulic pressure or mechanical force, and the kind and number of motors for use in vehicles are increasing.

Thus, in order to increase the efficiency of vehicles, such as fuel efficiency or the like, an increase in motor efficiency is essentially required. Since the motor efficiency is significantly affected by the magnetic properties of a magnetic substance, a rare earth metal-based magnetic substance having superior magnetic properties has been conventionally utilized.

However, the rare earth metal-based magnetic substance is expensive and thus the motor price is increased, and also, the vehicle manufacturing cost is increased. Furthermore, the supply of magnets is not sufficient.

Hence, magnetic substances that are inexpensive and have superior magnetic properties have been developed recently.

Among such magnetic materials, ferrite is an oxide-based magnetic material composed mainly of iron oxide ($Fe_2O_3$), and examples thereof may include soft ferrite, hard ferrite, and semi-hard ferrite, based on the magnetic properties thereof.

Soft ferrite is a soft magnetic substance that exhibits magnetism within a magnetic field, and is featured by low eddy-current loss in the high-frequency-range when compared to metals. Hard ferrite is a kind of permanent magnet, is useful for generating magnetic fields, is typically exemplified by Ba or Sr ferrite, has high magnetic anisotropy, and is inexpensive.

Although semi-hard ferrite is not easily magnetized, once it is magnetized, its state may be maintained, and semi-hard ferrite is thus applicable to memory, tape media, disks, etc. because degaussing thereof is easy.

In particular, a ferrite magnetic substance, which is employed in a ferrite core suitable for a transformer or inductor of an environmentally friendly vehicle, may be manufactured by compressing and then sintering a soft ferrite material, but suffers from relatively large core loss inappropriate for use in a magnetic core, heat generation due to the core loss, and deterioration of magnetic properties.

Moreover, since such a ferrite magnetic substance exhibits high core loss at high temperatures, it is difficult to apply to vehicles, which have to operate under various conditions. It is thus urgently required to develop a ferrite composition that exhibits low core loss at high temperatures to thus be applicable for use in a transformer or inductor of an environmentally friendly vehicle.

The disclosure of this section is to provide background of the invention. Applicant notes that this section may contain information available before this application. However, by providing this section, Applicant does not admit that any information contained in this section constitutes prior art.

SUMMARY

One aspect of the present invention provides a ferrite composition that exhibits low core loss at high temperatures to thus ensure superior magnetic properties at high temperatures, a ferrite magnetic substance using the same, and a method of manufacturing a ferrite magnetic substance.

According to one aspect, there is provided a method of manufacturing a ferrite magnetic substance, including: a first mixing operation of providing a first mixture comprising 47 to 49 wt % of Fe, 16 to 18 wt % of Mn, 5.2 to 7.2 wt % of Zn, and a remainder of oxygen and other inevitable impurities; a second mixing operation of providing a second mixture comprising the first mixture and an additive comprising, based on 100 parts by weight of the first mixture, 28 to 51 ppm of Si, 140 to 210 ppm of Nb and 155 to 185 ppm of Zr; and a finish operation of producing a ferrite magnetic substance by sintering the second mixture.

The first mixing operation of providing the first mixture may include providing the first mixture by mixing 67.8 to 69.9 wt % of iron oxide ($Fe_2O_3$), 6.8 to 8.8 wt % of zinc oxide (ZnO), 22.3 to 24.3 wt % of manganese oxide ($Mn_3O_4$) and other inevitable impurities, which are in a powder phase.

The method may include, before the first mixing operation of providing the first mixture, a preparation operation of coarsely grinding the iron oxide so that a particle size of the iron oxide is 1.15 μm or less.

In the finish operation, the ferrite magnetic substance may have a density of 4.8 g/cm$^3$ or more, a permeability of 3,300 or more, and a magnetic flux density of 520 mT or more.

The ferrite magnetic substance may have a core loss of 380 mW/cc or less under conditions of 100 KHz, 200 mT, and a temperature range of 80 to 100° C.

In the second mixing operation, the additive may include, based on 100 parts by weight of the first mixture, 60 to 100 ppm of silicon oxide ($SiO_2$), 200 to 300 ppm of niobium oxide ($Nb_2O_5$), and 200 to 250 ppm of zirconium oxide ($ZrO_2$), which are in a powder phase.

According to another aspect, there is provided a ferrite magnetic substance, formed through sintering and including 47.42 to 48.89 wt % of Fe, 16.06 to 17.50 wt % of Mn, 5.46 to 7.07 wt % of Zn, 28 to 47 ppm of Si, 140 to 210 ppm of Nb, 148 to 185 ppm of Zr, and a remainder of oxygen and other inevitable impurities.

The ferrite magnetic substance may have a density of 4.8 g/cm$^3$ or more and a porosity of 3.5% or less.

The ferrite magnetic substance may have a permeability of 3,300 or more and a magnetic flux density of 520 mT or more.

The ferrite magnetic substance may have a core loss of 380 mW/cc or less under conditions of 100 KHz, 200 mT, and a temperature range of 80 to 100° C.

The ferrite magnetic substance may be obtained by adding a first mixture comprising 67.8 to 69.9 wt % of iron oxide ($Fe_2O_3$), 6.8 to 8.8 wt % of zinc oxide (ZnO), and 22.3 to 24.3 wt % of manganese oxide ($Mn_3O_4$) and other inevitable impurities, with an additive including, based on 100 parts by weight of the first mixture, 60 to 100 ppm of silicon oxide ($SiO_2$), 200 to 300 ppm of niobium oxide ($Nb_2O_5$), and 200 to 250 ppm of zirconium oxide ($ZrO_2$).

BRIEF DESCRIPTION OF THE DRAWINGS

The above and other features and other advantages of the present invention will be more clearly understood from the following detailed description when taken in conjunction with the accompanying drawings, in which:

FIG. 1 is a flowchart illustrating a process of manufacturing a ferrite magnetic substance according to an embodiment of the present invention;

FIG. 2 is a graph illustrating core loss depending on the amounts of Zr and Mn;

FIG. 3 is an image of iron oxide particles used in the past.

FIG. 4 is an image of iron oxide particles used in embodiments of the present invention;

FIG. 5 is an image illustrating the porosity of a typical conventional ferrite magnetic substance;

FIG. 6 is an image illustrating the porosity of a ferrite magnetic substance manufactured according to embodiments of the present invention;

FIG. 7 is a graph illustrating core loss depending on the particle size of iron oxide under conditions of 100 KHz and 200 mT;

FIG. 8 is a graph illustrating core loss depending on the temperature of the ferrite magnetic substance manufactured according to an embodiment of the present invention; and FIG. 9 is a table illustrating various compositions of Examples and Comparative Examples and the magnetic properties of the produced ferrite magnetic substances.

DETAILED DESCRIPTION OF EMBODIMENTS

Hereinbelow, embodiments of the present invention will be described in detail with reference to the accompanying drawings, but are not construed as limiting the present invention.

For reference, the same reference numerals herein refer to the same or like parts, and may be described with reference to contents depicted in other drawings. Furthermore, descriptions which are deemed to be readily apparent to those skilled in the art or repetitive may be omitted.

FIG. 1 is a flowchart illustrating the process of manufacturing a ferrite magnetic substance according to an embodiment of the present invention.

As illustrated in FIG. 1, the method of manufacturing the ferrite magnetic substance according to an embodiment of the present invention may include a first mixing operation of producing a first mixture, a second mixing operation of producing a second mixture by mixing the first mixture with an additive for improving magnetic properties, and a finish operation of obtaining a ferrite magnetic substance by sintering the second mixture. In embodiments, an intermediate ferrite product is formed or molded with the second mixture. The intermediate ferrite product has a shape the same with that of a final ferrite product which is, for example, a ferrite core used in a vehicle. Subsequently to forming the intermediate ferrite product, the intermediate ferrite product is sintered to produce the final ferrite core.

In an embodiment of the present invention, the first mixture comprises 47 to 49 wt % of Fe, 16 to 18 wt % of Mn, 5.2 to 7.2 wt % of Zn, the remainder of oxygen, and inevitable impurities.

In the first mixing operation, iron oxide ($Fe_2O_3$), zinc oxide (ZnO) and manganese oxide ($Mn_3O_4$), which are in powder phase, are mixed, thus affording the first mixture, and the amounts thereof may be limited as follows: 67.8 to 69.9 wt % of iron oxide, 6.8 to 8.8 wt % of zinc oxide, and 22.3 to 24.3 wt % of manganese oxide.

The oxides noted above are base materials for the ferrite magnetic substance, and iron oxide functions to increase the permeability, magnetic flux density and curie temperature of the ferrite magnetic substance to thereby improve magnetic properties.

On the other hand, manganese oxide affects the permeability of the ferrite magnetic substance, and zinc oxide may decrease the curie temperature of the ferrite magnetic substance, or may increase core loss. Hence, these oxides are preferably added in amounts that satisfy the above mixing fractions.

In the case of iron oxide ($Fe_2O_3$), the relationship between the amounts of iron oxide, zinc oxide, and manganese oxide and the Fe, Mn, and Zn components is described. Useful in the present invention, iron oxide is configured such that two Fe atoms and three O atoms are bound to each other, and Fe atomic weight is 55.845 g/mol and O atomic weight is 15.9994 g/mol, and thus the molecular weight of iron oxide is 159.6882 g/mol.

Based on the following Equation (1), wt % of Fe atom in iron oxide is calculated to be 69.9425 wt %.

$$[(Fe\ atomic\ weight \times 2) \div (Fe_2O_3\ molecular\ weight)] \times 100 \qquad \text{Equation (1)}$$

In the first mixing operation, when 68.85 wt % of iron oxide ($Fe_2O_3$) is contained, the amount of iron of the first mixture is calculated to be 48.155 wt %. In the first mixing operation of producing the first mixture according to an embodiment of the present invention, the amounts of Fe, Zn and Mn may be determined based on the above Equation using iron oxide, zinc oxide, and manganese oxide.

In the second mixing operation according to an embodiment of the present invention, the first mixture, produced as above, is added with Si, Nb and Zr as additives for improving the magnetic properties of the ferrite magnetic substance, thus affording the second mixture. Based on 100 parts by weight of the first mixture, 28 to 51 wt ppm of Si, 140 to 210 wt ppm of Nb and 155 to 185 wt ppm of Zr are preferably added.

As such, Si, Nb and Zr may be added in the form of an oxide, and the amounts of silicon oxide, niobium oxide and zirconium oxide may be calculated based on the above Equation (1), and 60 to 100 ppm of silicon oxide ($SiO_2$), 200 to 300 ppm of niobium oxide ($Nb_2O_5$), and 200 to 250 ppm of zirconium oxide ($ZrO_2$) may be added.

Here, zirconium oxide (ZrO2) is used for grain boundary segregation of the ferrite magnetic substance, thus producing an insulating layer having high resistivity to thereby reduce core loss. In embodiments, zirconium oxide is included in the insulation layer or coating over ferrite grains, which electrically insulate neighboring grains from each other. In embodiments, zirconium oxide is added to the ferrite composition generally in an amount from about 200 ppm to about 250 ppm. In embodiments, zirconium oxide is in an amount of 190, 195, 198, 200, 202, 204, 206, 208, 210, 214, 218, 222, 226, 230, 234, 238, 240, 242, 246, 248, 250, 252, 255 or 260 ppm. In embodiments, the amount of zirconium oxide is in a range formed by any two numbers selected from those listed in the proceeding sentence.

If the amount of zirconium oxide is generally less than 200 ppm (not absolute) by weight based on 100 parts by weight of the first mixture, the insulating layer may not be sufficiently formed, thus deteriorating a reduction in core loss. On the other hand, if the amount thereof exceeds generally 250 ppm (not absolute), the insulating layer may be formed excessively thick, the brittleness of the ferrite magnetic substance may increase, and magnetic properties thereof may be rather deteriorated. Hence, the amount of this component is preferably limited to the above range.

Also, niobium oxide ($Nb_2O_5$) functions to finely form grains of the ferrite magnetic substance in the sintering process and to control a complex phase of calcium oxide (CaO) and silicon oxide ($SiO_2$), having high resistance, present at the grain boundary of the ferrite magnetic substance in order to prevent the magnetic properties from deteriorating. In embodiments, niobium oxide is added to the ferrite composition generally in an amount from about 200 ppm to about 300 ppm. In embodiments, niobium oxide is in an amount of 180, 195, 200, 210, 217, 225, 233, 240, 250, 255, 260, 266, 272, 280, 288, 295, 300, 305 or 315 ppm. In embodiments, the amount of niobium oxide is in a range formed by any two numbers selected from those listed in the proceeding sentence.

If the amount thereof is less than generally 200 ppm (not absolute) based on 100 parts by weight of the first mixture, the effect of inhibiting the growth of grains is insignificant and the effect of controlling the complex phase of calcium oxide (CaO) and silicon oxide ($SiO_2$) is also insignificant, thus deteriorating the magnetic properties. On the other hand, if the amount thereof exceeds generally 300 ppm (not absolute), inner defects may be caused, or the durability of the produced ferrite magnetic substance may be decreased. Hence, the amount thereof is limited within the above range.

Silicon oxide ($SiO_2$) is positioned at the grain boundary of the magnetic substance to prevent core loss. As described above, if this oxide is excessively added, a complex phase is formed with calcium oxide, thus increasing core loss. Hence, the amount thereof is limited within the above range. In embodiments, silicon oxide is added to the ferrite composition generally in an amount from about 60 ppm to about 100 ppm. In embodiments, silicon oxide is in an amount of 55, 60, 64, 70, 72, 74, 77, 81, 85, 88, 90, 95, 100, 105 or 110 ppm. In embodiments, the amount of silicon oxide is in a range formed by any two numbers selected from those listed in the proceeding sentence.

FIG. 2 is a graph illustrating the core loss depending on the amounts of Zr and Mn.

As illustrated in FIG. 2, when the amounts of Zr and Mn satisfy the above ranges, core loss of 350 mW/cc may be obtained under conditions of 80° C., 100 KHz, and 200 mT. If the amounts thereof exceed the above ranges, core loss may be remarkably increased.

In the operation of producing the second mixture, when the amounts of the additives are limited as above, core loss is reduced even at a high temperature of 80° C., thus improving the magnetic properties of the ferrite magnetic substance.

Preferably, the method of manufacturing the ferrite magnetic substance according to an embodiment of the present invention further comprises a preparation operation of coarsely grinding iron oxide before the first mixing operation.

In the preparation operation, iron oxide is coarsely ground to have an average particle size of 1.15 µm or less, and iron oxide thus prepared is illustrated in FIG. 4. FIG. 3 illustrates typical iron oxide used in the conventional method of producing a ferrite magnetic substance. The properties of individual powders are given in Table 1 below.

TABLE 1

|  | Apparent density (g/cc) | Particle size (µm) | Specific surface area (m²/g) | Component (wt %) | | | | |
| --- | --- | --- | --- | --- | --- | --- | --- | --- |
|  |  |  |  | $Fe_2O_3$ | Mn | $SiO_2$ | Cl | $SO_3$ |
| Comp. Example | 0.42 | 0.79 | 3.43 | 99.45 | 0.2602 | 0.0085 | 0.141 | 0.0421 |
| Example | 0.62 | 0.61 | 6.34 | 99.34 | 0.3044 | 0.0090 | 0.156 | 0.0916 |

As is apparent from Table 1, the iron oxide used in an Example of the present invention was similar in composition to typically used iron oxide but the particle size thereof was decreased by about 22%, and thus the apparent density was increased by about 48% and the specific surface area was approximately doubled.

As illustrated in FIGS. 3 and 4, the coarse powder fraction was low and the particle size became uniform compared to the conventional case.

When the particle size of iron oxide is finely controlled in this way, the apparent density and specific surface area may be greatly increased, and such an iron oxide is added in the largest amount in the production of the ferrite magnetic substance, whereby the apparent density of the resulting ferrite magnetic substance is increased, thus significantly improving magnetic properties.

After the second mixture is produced in this way, during the finish operation, the second mixture is placed in a sintering furnace, whereby a ferrite magnetic substance is produced.

The produced ferrite magnetic substance was composed of 47.42 to 48.89 wt % of Fe, 16.06 to 17.50 wt % of Mn, 5.46 to 7.07 wt % of Zn, 28 to 47 ppm of Si, 140 to 210 ppm of Nb, 148 to 185 ppm of Zr, and the remainder of oxygen and other inevitable impurities.

FIGS. 5 and 6 are images for comparing the porosity of a conventional ferrite magnetic substance and the ferrite magnetic substance according to the Example of the present invention.

As illustrated in FIGS. 5 and 6, the particle size of iron oxide is decreased to thus increase the apparent density and specific surface area, whereby the porosity of the ferrite magnetic substance manufactured through sintering is decreased from 10.1% to 3.2%, that is, it is decreased by about 69%, ultimately densifying the structure of the produced ferrite magnetic substance.

FIG. 7 is a graph illustrating the core loss depending on the particle size of iron oxide at 100 KHz and 200 mT, and FIG. 8 is a graph illustrating the core loss depending on the temperature of the ferrite magnetic substance manufactured in the Example of the present invention.

As illustrated in FIG. 7, as the average particle size of iron oxide is decreased to 1.15 μm or less, a ferrite magnetic substance having superior magnetic properties, such as core loss of 350 mW/cc or less, can be obtained under conditions of 100 KHz, 200 mT and a high temperature of 100° C.

As illustrated in FIG. 8, the conventional ferrite magnetic substance exhibited core loss greater than 350 mW/cc at high temperatures of 80 to 100° C. In embodiments of the present invention, however, the core loss can be maintained at 350 mW/cc or less even at high temperatures of 80 to 100° C., resulting in the ferrite magnetic substance having superior magnetic properties.

FIG. 9 is a table illustrating the compositions of Examples and Comparative Examples and the magnetic properties of the produced ferrite magnetic substances.

As illustrated in FIG. 9, when iron oxide, manganese oxide and zinc oxide satisfy the Examples of the present invention, the resulting ferrite magnetic substance can exhibit low changes in core loss in response to changes in temperature. In particular, core loss can fall in the range of 350 mw/cc or less at temperatures ranging from 80 to 100° C., reflecting the use conditions of transformers or inductors for vehicles, thus effectively improving the thermal stability of transformers or inductors for use in vehicles.

As discussed above, the ferrite magnetic substance can reduce core loss in the temperature range of 80 to 100° C. and can thus exhibit superior high-temperature magnetic properties. Furthermore, the performance of a transformer or an inductor using the same can be improved, resulting in increased fuel efficiency and performance of environmentally friendly vehicles.

Although embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a ferrite magnetic substance, comprising:
    providing a first mixture comprising 47 to 49 wt % of Fe, 16 to 18 wt % of Mn, 5.2 to 7.2 wt % of Zn, and a remainder of oxygen and other inevitable impurities;
    providing a second mixture comprising the first mixture and an additive comprising, based on 100 parts by weight of the first mixture, 28 to 51 ppm of Si, 140 to 210 ppm of Nb and 155 to 185 ppm of Zr; and
    sintering the second mixture to produce a ferrite magnetic substance,
    wherein the ferrite magnetic substance comprises an insulation layer formed by grain boundary segregation with 155 to 185 ppm of Zr, wherein the ferrite magnetic substance has a core loss of 350 mW/cc or less under conditions of 100 KHz, 200 mT, and a temperature range of 80 to 100° C.

2. The method according to claim 1, wherein providing the first mixture comprises mixing 67.8 to 69.9 wt % of iron oxide ($Fe_2O_3$), 6.8 to 8.8 wt % of zinc oxide (ZnO), 22.3 to 24.3 wt % of manganese oxide ($Mn_3O_4$) which are in powder.

3. The method according to claim 2, further comprising, before providing the first mixture,
    grinding the iron oxide to form iron oxide particles in a size of 1.15 μm or less.

4. The method according to claim 1, wherein the ferrite magnetic substance has a density of 4.8 $g/cm^3$ or more, a permeability of 3,300 or more, and a magnetic flux density of 520 mT or more.

5. The method according to claim 1, wherein the additive comprises, based on 100 parts by weight of the first mixture, 60 to 100 ppm of silicon oxide ($SiO_2$), 200 to 300 ppm of niobium oxide ($Nb_2O_5$), and 200 to 250 ppm of zirconium oxide ($ZrO_2$), which are in a powder phase.

6. A ferrite magnetic substance, formed through sintering and comprising 47.42 to 48.89 wt % of Fe, 16.06 to 17.50 wt % of Mn, 5.46 to 7.07 wt % of Zn, 28 to 47 ppm of Si, 140 to 210 ppm of Nb, 148 to 185 ppm of Zr, and a remainder of oxygen and other inevitable impurities, wherein the ferrite magnetic substance comprises an insulating layer formed by grain boundary segregation with 148 to 185 ppm of Zr,
    wherein the ferrite magnetic substance has a core loss of 350 mW/cc or less under conditions of 100 KHz, 200 mT, and a temperature range of 80 to 100° C.

7. The ferrite magnetic substance according to claim 6, having a density of 4.8 $g/cm^3$ or more and a porosity of 3.5% or less.

8. The ferrite magnetic substance according to claim 7, having a permeability of 3,300 or more and a magnetic flux density of 520 mT or more.

9. The ferrite magnetic substance according to claim 6, wherein the ferrite magnetic substance is obtained by adding a first mixture comprising 67.8 to 69.9 wt % of iron oxide ($Fe_2O_3$), 6.8 to 8.8 wt % of zinc oxide (ZnO), and 22.3 to 24.3 wt % of manganese oxide ($Mn_3O_4$) and other inevitable impurities, with an additive comprising, based on 100 parts by weight of the first mixture, 60 to 100 ppm of silicon oxide ($SiO_2$), 200 to 300 ppm of niobium oxide ($Nb_2O_5$), and 200 to 250 ppm of zirconium oxide ($ZrO_2$).

* * * * *